United States Patent
Herges et al.

(10) Patent No.: US 8,560,162 B2
(45) Date of Patent: Oct. 15, 2013

(54) MONITORING DEVICE FOR MONITORING SYSTEMS OF A VEHICLE

(75) Inventors: Michael Herges, Munich (DE); Friedbert Roether, Cleebronn (DE); Juergen Steinberger, Groebenzell (DE); Péter Frank, Budapest (HU)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 86 days.

(21) Appl. No.: 12/737,212

(22) PCT Filed: Jun. 10, 2009

(86) PCT No.: PCT/EP2009/004161
§ 371 (c)(1),
(2), (4) Date: Mar. 1, 2011

(87) PCT Pub. No.: WO2009/152982
PCT Pub. Date: Dec. 23, 2009

(65) Prior Publication Data
US 2011/0144855 A1    Jun. 16, 2011

(30) Foreign Application Priority Data

Jun. 20, 2008   (DE) .................. 10 2008 029 310

(51) Int. Cl.
*G01M 17/00*   (2006.01)
(52) U.S. Cl.
USPC ........................................... 701/29.7
(58) Field of Classification Search
None
See application file for complete search history.

(56) References Cited

U.S. PATENT DOCUMENTS

| | | | |
|---|---|---|---|
| 5,632,530 A | 5/1997 | Brearley | |
| 8,261,548 B2 * | 9/2012 | Ofner | 60/598 |
| 2007/0030844 A1 * | 2/2007 | Fukuta et al. | 370/359 |
| 2008/0221776 A1 * | 9/2008 | McClellan | 701/103 |
| 2008/0309154 A1 | 12/2008 | Hilberer | |
| 2009/0138137 A1 * | 5/2009 | Iwagami et al. | 701/1 |

FOREIGN PATENT DOCUMENTS

| | | |
|---|---|---|
| DE | 195 10 522 | 9/1996 |
| DE | 694 02 117 | 6/1997 |
| DE | 694 02 117 | 12/2005 |
| DE | 10 2006 055 570 | 5/2008 |
| EP | 0 357 922 | 3/1990 |
| JP | 2002274348 | 9/2002 |
| JP | 2006044624 | 2/2006 |
| WO | 2007028586 A1 | 3/2007 |

OTHER PUBLICATIONS

European Patent Office, International Preliminary Report on Patentability and Written Opinion, Jan. 6, 2011, from International Patent Application No. PCT/EP2009/004161, filed on Jun. 10, 2009.

(Continued)

*Primary Examiner* — Thomas Tarcza
*Assistant Examiner* — Adam Alharbi
(74) *Attorney, Agent, or Firm* — Kenyon & Kenyon LLP

(57) ABSTRACT

A monitoring device for monitoring systems of a vehicle, at least some systems of which having self-monitoring routines for self-monitoring and/or some systems of which having external monitoring routines for performing external monitoring of other systems which are not provided for the functions of their own systems or for self-monitoring.

9 Claims, 3 Drawing Sheets

(56) References Cited

OTHER PUBLICATIONS

European Patent Office, Translation of International Preliminary Report on Patentability and Written Opinion, Jan. 27, 2011, from International Patent Application No. PCT/EP2009/004161, filed on Jun. 10, 2009.

Office Action dated Apr. 22, 2013 of corresponding Japanese Application No. 2011-513921.

* cited by examiner

MONITORING DEVICE FOR MONITORING SYSTEMS OF A VEHICLE

FIELD OF THE INVENTION

The present invention relates to a monitoring device for monitoring systems of a vehicle.

BACKGROUND INFORMATION

An electronic brake system EBS with a test system for testing the brakes is discussed, for example, in German patent document DE 694 02 117 T2.

Electronic brake systems (EBS) currently comprise self-monitoring devices and fall-back levels which are based on their own measured values or on measured values located on the vehicle bus.

SUMMARY OF THE INVENTION

The object of the invention is, in contrast with the above, to develop a monitoring device of the type mentioned at the beginning in such a way that improved fault monitoring and more precise fault localization are possible.

This object may be achieved according to the invention by means of the features described herein.

According to a first alternative, the invention proposes a monitoring device for monitoring systems of a vehicle, at least some systems of which having self-monitoring routines for self-monitoring and some systems of which having external monitoring routines for performing external monitoring of other systems which are not provided for the functions of their own systems or for self-monitoring, wherein, when a malfunction or a fault is detected in at least one function assigned to a first system of the systems, by self-monitoring routines of this first system, a second system is activated by the one first system having the fault or the malfunction or by external monitoring routines of a third system monitoring this one first system, in order to detect and/or localize the fault or the malfunction in the at least one function of the first system by means of actuators and/or sensors assigned to the second system, and/or in order to activate an emergency operating program of the second system as a replacement for the disrupted functioning of the first system.

In this context, special monitoring routines are carried out in the second system by the first system by means of commands which are transmitted via the data bus, triggered and carried out in the second system. The results thereof are fed back to the first system, also via the data bus, and evaluated there, if appropriate together with general data which this system itself has determined and/or which are transmitted on a standard basis on the data bus which is present. The second system uses for this purpose its sensors and/or its actuators, possibly also with the aid of vehicle bus data. The triggering of the routines and the evaluation of the results can also be performed by a third system, for example a central vehicle computer, if the first system has signaled a corresponding fault or a corresponding fault has been detected in the first system via the monitoring third system.

Since the first and second systems generally have sensors and actuators, in particular, a parking brake device and an electronic service brake device of a vehicle at different positions or locations on the vehicle, better possibilities are obtained for detecting a faulty behavior of a vehicle system, in particular of a vehicle brake system, and/or of localizing the cause thereof. As a result, safety can be increased and repairs made easier. In addition, unnecessary repair measures, which would be carried out without knowledge of the actual cause of the malfunction, can be avoided.

In the event of a fault in one of the systems, there is also the possibility of having functions carried out by the respective other system—possibly with restricted functionality (back-up function). The execution of these functions can be triggered here by the faulty first system itself, by a third system, for example a central vehicle computer if it has detected the fault in the faulty system, or can be carried out independently by the second system if said system detects, by reference to its own measured values or vehicle bus data or through the failure of vehicle bus data to occur, that the first system is faulty. This provides a higher level of availability of the systems.

As a second alternative, a monitoring device for monitoring systems of a vehicle is proposed, at least some systems of which have self-monitoring routines for self-monitoring and some systems of which have external monitoring routines for external monitoring of other systems which are not provided for functions of their own systems or for self-monitoring, wherein, when a malfunction or a fault is detected in at least one function which is assigned to a first of the systems, by external monitoring routines of a second system, an emergency operating program of the second system is activated as a replacement for the disrupted function of the first system.

Advantageous developments and improvements of the invention specified in claim 1 and in claim 2 are possible by virtue of the measures disclosed in the subclaims.

The self-monitoring routines and/or the external monitoring routines may detect the at least one fault or a malfunction of a function of the first system through the type of the signals modulated by the first system and/or through a failure of signals modulated by the first system to occur.

The first system may particularly be an electric parking brake device (ECPB), and the second system may particularly be an electric service brake device (EBS) of a towing vehicle of a towing vehicle/trailer combination.

More details can be found in the following description of an exemplary embodiment.

An exemplary embodiment of the invention is illustrated below in the drawing and explained in more detail in the following description.

DETAILED DESCRIPTION

Figure 1:
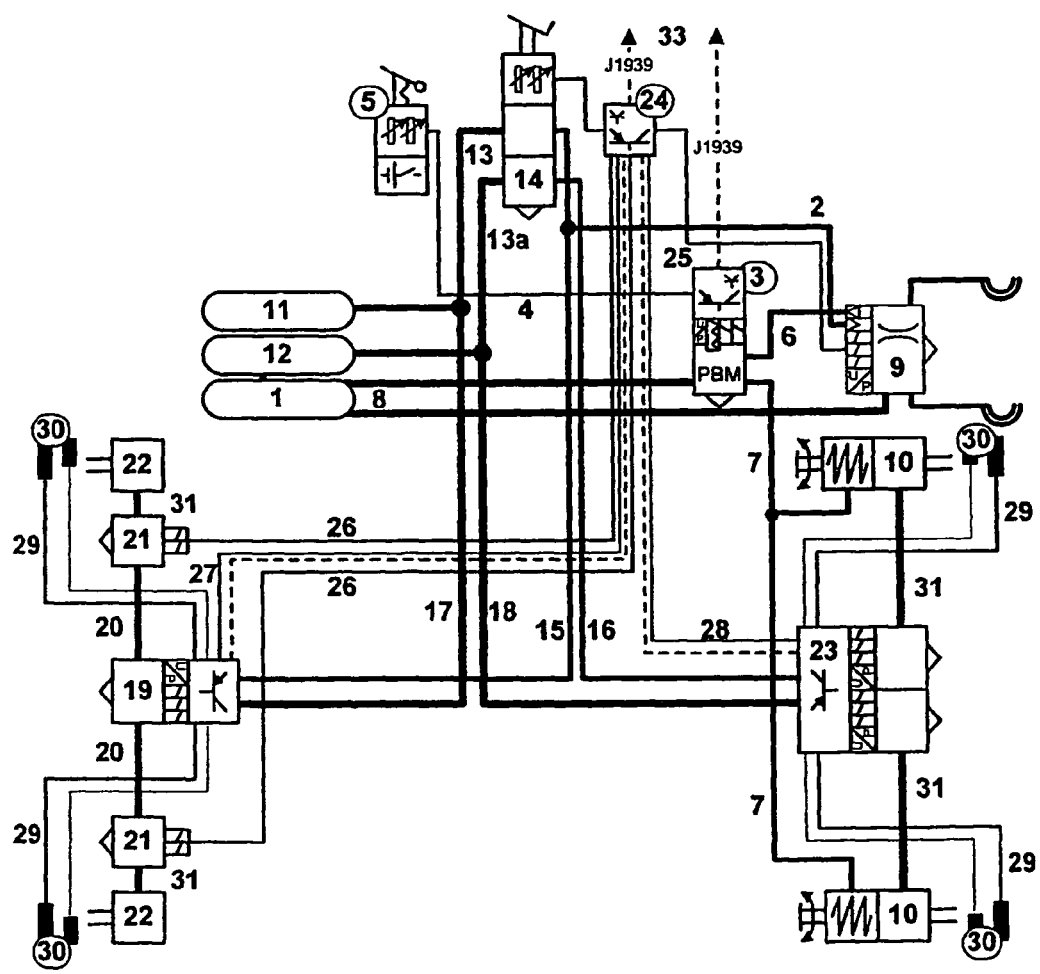
FIG. 1 shows a schematic circuit diagram of a brake system of a towing vehicle of a towing vehicle/trailer combination containing an electric parking brake device (ECPB), with a parking brake module (PBM), and an electric service brake device (EBS) with a trailer control module (TCM).

The brake system (shown schematically in FIG. 1) of a towing vehicle of a towing vehicle/trailer combination includes an electric parking brake device, with a parking brake module (PBM), and an electric service brake device (EBS) with a trailer control module (TCM).

In particular, the brake system comprises:
- a compressed air reservoir 1,
- a pneumatic control line 2 which leads from a foot brake module (FBM) 14 to a trailer control module (TCM) 9,
- a parking brake module (PBM) 3, electrical control lines 4 for the parking brake module (PBM) 3, a manual activation device 5 for the parking brake module (PBM) 3, a pneumatic control line 6 between the parking brake module (PBM) 3 and the trailer control module (TCM) 9, pneumatic control line 7 between the parking brake module (PBM) 3 and spring-loaded brake cylinders 10 of the rear axle, pneumatic supply lines 8 between the compressed air reservoir 1 and the parking brake module (PBM) 3 or the trailer control module (TCM) 9, the trailer control module (TCM) 9, the spring-loaded brake cylinders 10 of the rear axle, a compressed air reservoir 11, a compressed air reservoir 12, a pneumatic supply line 13 from the compressed air reservoir 11 to the foot brake module 14, a pneumatic supply line 13a from the compressed air reservoir 12 to the foot brake module 14, the foot brake module 14, a pneumatic control line 15 between the foot brake module 14 and a single-channel front-axle pressure-regulating module 19, a pneumatic control line 16 between the foot brake module 14 and a two-channel rear-axle pressure-regulating module 23, a pneumatic supply line 17 between the compressed air reservoir 11 and the front-axle pressure-regulating module 19, a pneumatic supply line 18 between the compressed air reservoir 12 and a rear-axle pressure-regulating module 23, the front-axle pressure-regulating module 19, pressure lines 20 between the front-axle pressure-regulating module 19 and pressure control valves 21, pressure control valves 21 for the ABS function of the front axle, for example select-low, select-high or select-smart, service brake cylinder 22 of the front axle, the two-channel pressure-regulating module 23 of the rear axle, a control unit (ECU) 24 of the electronic brake system (EBS), electrical control lines 25 between the control unit (ECU) 24 of the electronic brake system (EBS) and the trailer control module (TCM) 9, electrical control lines 26 between the control unit (ECU) 24 of the electronic brake system (EBS) and the pressure control valves 21 of the front axle, electrical power supply lines and CAN data bus 27 between the control unit (ECU) 24 of the electronic brake system (EBS) and the pressure-regulating module 19 of the front axle, electrical power supply lines and CAN data bus 28 between the control unit (ECU) 24 of the electronic brake system (EBS) and the pressure-regulating module 23 of the rear axle, sensor cable 29, wheel speed sensors 30, brake pressure lines 31 between the pressure control valves 19 and the service brake cylinders 22 of the front axle or between the pressure-regulating module 23 and the spring-loaded brake cylinders 10 of the rear axle, CAN (Control Area Network) data bus lines 33, for example J1939.

On the rear axle of the towing vehicle there are, in addition to the spring-loaded brake cylinders 10, also service brake cylinders, but these are not explicitly shown in FIG. 1. The service brake cylinders and the spring-loaded brake cylinders may be integrated in combination cylinders.

The design of the foot brake module (FBM) 14 for an electrical service brake device EBS is similar to the conventional, purely pneumatic foot brake valves (FBV). However, the electronic setpoint values for regulating the braking force are additionally sensed in the foot brake module (FBM) 14. The foot brake module (FBM) 14 therefore performs two functions.

Two redundant sensors (for example potentiometers) sense the braking request of the driver by measuring the activation travel of an FBM plunger. The measured value is transmitted redundantly to the central control unit EBS-ECU 24 and converted there into a braking request.

Similarly to a conventional foot brake valve FBV, the pneumatic control pressure is modulated in accordance with the activation travel. These control pressures are required for the back-up control in the event of a fault in the electronic service brake device EBS.

The pressure-regulating modules 19, 23 form the interface between the electric service brake device EBS and the pneumatic braking force. They convert the brake setpoint pressures transmitted via the data bus CAN J1939 into pneumatic pressures. The conversion is carried out with proportional magnets or with an inlet/outlet magnet combination. A pressure sensor measures the modulated brake pressure. A brake-pressure-regulating process can therefore take place in a closed control loop. An electrically activated back-up solenoid valve shuts off the pneumatic control pressures of the foot brake module FBM 14 in order to permit non-influenced electrical regulation of the pressure.

The installation of the pressure-regulating modules 19, 23 in the vicinity of the wheels permits the connection of the sensors 30 for the wheel speed and the brake lining wear over short electric lines. These signals are transmitted to the central control unit EBS-ECU 24 via the data bus CAN J1939.

The electronic trailer control module TCM 9 permits the trailer control pressure to be regulated in accordance with the functional requirements of the electric service brake device EBS. The limits of the electrical regulating ranges are defined in legal requirements. The conversion of the electronically predefined setpoint value into a modulated pressure is done with a similar magnet arrangement to that in the pressure-regulating modules 19, 23. The shutting off of the back-up pressure is carried out, depending on the design principle, by means of a back-up solenoid valve BV (see FIG. 3) or by means of pneumatic restraint.

The activation of the trailer control module TCM 9 must be carried out with two independent control signals under all normal conditions. These signals may be two pneumatic signals from two control circuits or a pneumatic control signal and an electrical control signal. However, in this case, the electrical control signal must be available under all usual operating states.

The activation of the foot brake module FBM 14 leads to a calculation of the braking request in the central control unit EBS-ECU 24. At the same time, the back-up solenoid valves in the pressure-regulating modules 19 23 are activated and the pneumatic control pressures are shut off. The electronic control unit EBS-ECU 24 then calculates the optimum brake pressure as a function of the braking request, the mass of the vehicle and the axle load distribution etc. This setpoint brake pressure is transmitted to the brake-regulating modules 19, 23 via the data bus CAN J1939.

According to the arrangement, the pressure-regulating modules 19, 23 apply the brake pressure to the brake cylinders 22 on an axis basis or wheel basis. A braking request which corresponds to the trailer control pressure is conveyed to the electric service brake device EBS of the trailer via a CAN ISO 11992.

For functions such as TCS (traction control system) or ESP (electronic stability program), brake pressure is built up in the brake-regulating modules 19, 23 and applied to the brake cylinders 22 independently of the driver's request.

Figure 2:
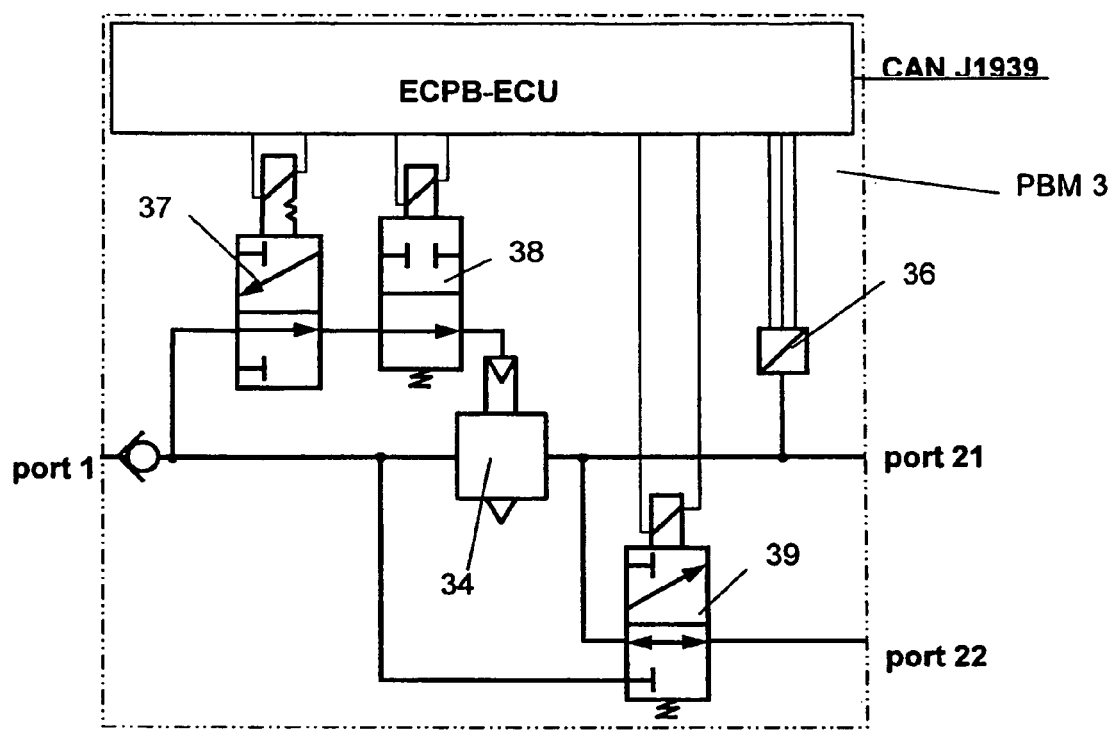
FIG. 2 shows a schematic circuit diagram of the parking brake module (PBM) in FIG. 1.

The parking brake module (PBM) 3 includes, according to FIG. 2:
- a relay valve part 34, which, independently of the pressure in its control chamber, applies a pressure in its working chamber which is present at a port 21 of the parking brake module 3 which is connected via the pneumatic control lines 7 (see FIG. 1) to the spring-loaded cylinders 10 of the rear axle,
- a pressure sensor 36, which measures the pressure in the working chamber of the relay valve 34,
- a bistable 3/2-way solenoid valve 37 for permanently ventilating or venting the control chamber of the relay valve 34,
- a 2/2-way solenoid valve 38 for holding the pressure in the control chamber of the relay valve 34,
- a 3/2-way solenoid valve 39 (test magnet) for feeding through the pressure in the working chamber of the relay valve 34, or a reservoir pressure present at a reservoir port 1, to a trailer port 22, and
- a control unit ECPB-ECU 40 of the parking brake device ECPB which controls the valves 37, 38, 39 and receives signals from the pressure sensor 36, and is connected to the vehicle data bus CAN J1939.

Figure 3:
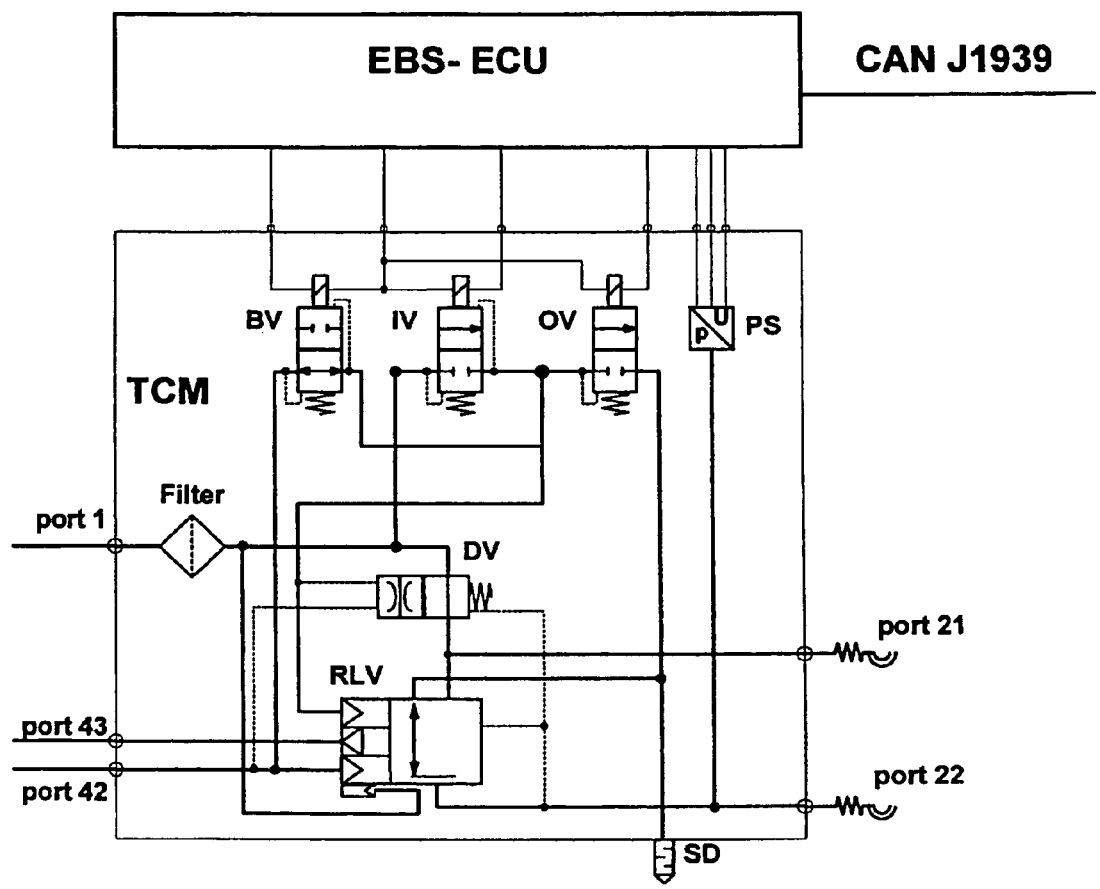
FIG. 3 shows a schematic circuit diagram of the trailer control module (TCM) in FIG. 1.

The trailer control module TCM 9 according to FIG. 3 contains:
- a triple-actuation relay valve RLV,
- a back-up valve BV,
- an inlet valve IV,
- an outlet valve OV,
- a throttle valve DV,
- a pressure sensor PS for measuring the pressure in the trailer brake line which is connected to a port 22 which leads to a coupling head "brake" of the towing vehicle and supplies the trailer with control pressure for the trailer brake,
- a port 21 which leads to a coupling head "supply" of the towing vehicle and supplies the trailer with reservoir pressure,
- a port 43 to which the port 22 of the parking brake module (PBM) 3 (FIG. 2) is connected via the pneumatic control line 6,
- a port 42 to which the pneumatic control line 2, which leads to the foot brake module (FBM) 14, is connected and in which the pneumatic control pressure of the foot brake module (FBM) 14 is applied,
- a port 1 to which the compressed air reservoir 1 is connected,
- a venting means SD which is connected to the outlet valve OV.

The valves BV, IV, OV of the trailer control module (TCM) 9 are actuated by the control unit EBS-ECU 24 of the electric service brake device (EBS), which in turn has a communication connection to the data bus CAN J1939.

Consequently, the control unit ECPB-ECU 40 (see FIG. 2) of the electric parking brake device ECPB and the control unit EBS-ECU 24 (see FIG. 3) of the electrically controlled service brake device (EBS) are installed in the towing vehicle and connected to a common data bus, for example the vehicle data bus CAN J1939. Then, possibilities arise for mutual monitoring and more precise fault localization in the parking brake device ECPB and the service brake device EBS.

If the driver applies the parking brake by activating the manual activation device 5, the pneumatic control line 6 which leads from the port 22 of the parking brake module PBM 3 (FIG. 2) to the port 43 of the trailer control module TCM 9 (FIG. 3) has to be vented since trailer control modules invert the pressure applied on the control side so that the port 22 of the trailer control module TCM 9 has to be ventilated in order to adjust the brakes of the trailer to the brake application position. The pneumatics of the trailer control module TCM 9, which is associated with the electric service brake device EBS, must therefore build up pressure in the control line to the trailer (inverse pressure control), i.e. at its port 22. This pressure at the port 22 of the TCM 9 is sensed by the pressure sensor PS in the trailer control module TCM 9 and conveyed to the EBS-ECU 24, which constitutes the control unit of the electric service brake device EBS.

The ECPB-ECU 40 of the parking brake device ECPB can interrogate the pressure at port 22 of the trailer control module TCM 9 via the CAN data bus J1939 as the communication connection between the EBS-ECU 24 as the control unit of the electric service brake device EBS and of the ECPB-ECU 40 as the control unit of the parking brake device ECPB. If this pressure is not built up at the port 22 of the trailer control module TCM 9, the parking brake function is faulty or the reservoir pressure at port 1 of the parking brake module PBM 3 or at port 1 of the trailer control module TCM 9 is too low.

Assuming that the venting of the spring-loaded brake cylinders 10 in the towing vehicle were successful, the following faults are possible:

1. There is no reservoir pressure present at the port 1 of the trailer control module TCM 9.
   The value for the reservoir pressure which is conveyed to the ECPB-ECU 40 via the data bus CAN J1939 is zero.
   However, there is no fault display since a fault can also be present in the compressed air supply as a normal operating state if, for example, the compressed air reservoir is not yet filled.
   No fall-back level (back-up) is assumed since the state of the compressed air supply can be influenced neither by the electronic service brake system EBS nor by the parking brake device ECPB. However, since the supply line to the trailer (port 21 of the trailer control module TCM 9) is also vented, the trailer automatically applies the brake by means of the anti-jackknifing function.

2. The 3/2-solenoid valve 39 (test magnet) in the parking brake module PBM 3 is incorrectly energized, for example owing to a fault in the ECPB-ECU 40.
   The CAN J1939 data bus signals a sufficient reservoir pressure. The valve feedback testing is carried out by the ECPB-ECU 40 within the scope of the self-monitoring routines.
   There is no fault display by the EBS-ECU 24 since the fault lies in the parking brake device ECPB, but a fault message is issued by the ECPB-ECU 40, for example: "Valve feedback fault in the 3/2-way solenoid valve 39".
   The ECPB-ECU 40 sends a command, as a fall-back level, to the EBS-ECU 24 to apply the pressure to the trailer electrically.

3. The supply line (port 1 at TCM 9) to the trailer control module TCM 9 is torn or blocked.
   The CAN J1939 data bus signals a sufficient reservoir pressure. ECPB-ECU 40 sends a command to the EBS-ECU 24 to apply the pressure to the trailer electrically. If this is not successful, the EBS-ECU 24 will detect after some time that no venting of the control line (port 22) to the trailer is possible and will set corresponding faults.

The ECPB-ECU 40 does not display a fault since the fault is present in the service brake device EBS, wherein the EBS-ECU 24 signals "fault in the supply line (port 1) to the trailer control module TCM 9".

There is no fall-back level since neither the service brake device EBS nor the parking brake device ECPB has an intervention possibility. Since the supply line (port 21) to the trailer is also vented, the trailer brakes automatically by means of the anti-jackknifing function.

4. The 3/2-way solenoid valve 39 (test magnet) sticks mechanically or the line to the port 43 of the trailer control module TCM 9 is blocked.

This is detected because none of the other faults is present.

There is no fault display by the ECPB-ECU 40 such as, for example, "line to the port 43 of the trailer control module TCM 9 is blocked or 3/2-way solenoid valve (test magnet) 39 is mechanically defective". A fault message is not issued by the EBS-ECU 24 since the fault has occurred in the region of the parking brake device ECPB.

The ECPB-ECU 40 sends, as a fall-back level, the command to the EBS-ECU 24 to apply the pressure to the trailer electrically.

Without the interrogation of the trailer pressure at port 22 of the parking brake module PBM 3 or at port 43 of the trailer control module 9, the fault would not have been detected. Through the use of the electrical actuators, controlled by means of the EBS-ECU 24, it is possible, after the detection of the fault, to localize the possible causes better and possibly activate a back-up function by means of the EBS-ECU 24 when certain causes are present.

The sensors which detect a fault or a malfunction in the electric parking brake device ECPB within the scope of self-monitoring consequently contain the pressure sensor 36 in the parking brake module PBM 3 as well as the solenoid valves 34, 37, 38 and 39 in the parking brake module PBM 3 for regulating pressure at the port 22 and for carrying out the test function.

Sensors and actuators which are assigned to the electric service brake device EBS and which detect and/or localize the fault or the malfunction in at least one function of the electric parking brake device ECPB and/or activate an emergency operating program of the electric service brake device EBS as a replacement for the disrupted function of the electric parking brake device ECPB, contain a pressure sensor in the trailer control module TCM 9 as a sensor and the solenoid valves in the trailer control module TCM 9 for regulating pressure as actuators.

THE LIST OF REFERENCE NUMERALS IS AS FOLLOWS

1 Compressed air reservoir
2 Control line
3 Parking brake module PBM
4 Electric control lines
5 Manual activation device
6 Pneumatic control line
7 Pneumatic control lines
8 Pneumatic supply lines
9 Trailer control module TCM
10 Spring-loaded brake cylinder
11 Compressed air reservoir
12 Compressed air reservoir
13 Pneumatic supply line
13*a* Pneumatic supply line
14 Foot brake module
15 Pneumatic control line
16 Pneumatic control line
17 Pneumatic supply line
18 Pneumatic supply line
19 Front-axle pressure-regulating module
20 Pressure lines
21 Pressure control valves
22 Service brake cylinder
23 Pressure-regulating module
24 Control unit (ECU) of the electronic brake system (EBS)
25 Electric control lines
26 Electric control lines
27 Electric power-supply lines and CAN data bus
28 Electric power-supply lines and CAN data bus
29 Sensor cable
30 Wheel speed sensors
31 Brake pressure lines
33 CAN (Control Area Network) data bus lines
34 Relay valve part
36 Pressure sensor
37 Bistable 3/2-way solenoid valve
38 2/2-way solenoid valve
39 3/2-way solenoid valve (test magnet)
40 ECPB-ECU

The invention claimed is:

1. A monitoring device for monitoring systems of a vehicle, in which there are at least one of some systems having self-monitoring routines for self-monitoring and some systems having external monitoring routines for performing external monitoring of other systems which are not provided for the functions of their own systems or for self-monitoring, comprising:
an activating arrangement to activate, when a malfunction or a fault is detected in at least one function assigned to a first system of the systems (ECPB), by self-monitoring routines of this first system (ECPB), a second system (EBS) by the one first system (ECPB) having the fault or the malfunction or by external monitoring routines of a third system monitoring this one first system (ECPB), wherein the activating arrangement is adapted to at least one of detect and localize the fault or the malfunction in the at least one function of the first system (ECPB) by at least one of actuators and sensors assigned to the second system (EBS), and activate an emergency operating program of the second system (EBS) as a replacement for the disrupted functioning of the first system.

2. A monitoring device for monitoring systems of a vehicle, at least some systems of which have self-monitoring routines for self-monitoring and some systems of which have external monitoring routines for performing external monitoring of other systems which are not provided for functions of their own systems or for self-monitoring, comprising:
an activating arrangement to activate, when a malfunction or a fault is detected in at least one function which is assigned to a first of the systems (ECPB), by external monitoring routines of a second system (EBS), an emergency operating program of the second system (EBS) as a replacement for the disrupted function of the first system (ECPB).

3. The monitoring device of claim 1, wherein at least one of the self-monitoring routines and the external monitoring routines detect a fault or a malfunction of the at least one function of the first system (ECPB) by at least one of the type of the signals modulated by the first system (ECPB) and by the failure of signals modulated by the first system (ECPB) to occur.

4. The monitoring device of claim 1, wherein the first system is an electric parking brake device (ECPB), and wherein the second system is an electric service brake device (EBS) of a towing vehicle of a towing vehicle/trailer combination.

5. A monitoring device for monitoring systems of a vehicle, in which there are at least one of some systems having self-monitoring routines for self-monitoring and some systems having external monitoring routines for performing external monitoring of other systems which are not provided for the functions of their own systems or for self-monitoring, comprising:
an activating arrangement to activate, when a malfunction or a fault is detected in at least one function assigned to a first system of the systems (ECPB), by self-monitoring routines of this first system (ECPB), a second system (EBS) by the one first system (ECPB) having the fault or the malfunction or by external monitoring routines of a third system monitoring this one first system (ECPB);
wherein the activating arrangement at least one of perform at least one of the following: (i) at least one of detects and localizes the fault or the malfunction in the at least one function of the first system (ECPB) by at least one of actuators and sensors assigned to the second system (EBS), and (ii) activate an emergency operating program of the second system (EBS) as a replacement for the disrupted functioning of the first system,
wherein at least one of the self-monitoring routines and the external monitoring routines detect a fault or a malfunction of the at least one function of the first system (ECPB) by at least one of the type of the signals modulated by the first system (ECPB) and by the failure of signals modulated by the first system (ECPB) to occur, and
wherein the sensors, which are assigned to the electric service brake device (EBS), contain at least one pressure sensor of a trailer control module (TCM, 9), and wherein the actuators, which are assigned to the electric service brake device (EBS), contain solenoid valves of the trailer control module (TCM 9) for regulating pressure.

6. A monitoring device for monitoring systems of a vehicle, in which there are at least one of some systems having self-monitoring routines for self-monitoring and some systems having external monitoring routines for performing external monitoring of other systems which are not provided for the functions of their own systems or for self-monitoring, comprising:
an activating arrangement to activate, when a malfunction or a fault is detected in at least one function assigned to a first system of the systems (ECPB), by self-monitoring routines of this first system (ECPB), a second system (EBS) by the one first system (ECPB) having the fault or the malfunction or by external monitoring routines of a third system monitoring this one first system (ECPB);
wherein the activating arrangement at least one of perform at least one of the following: (i) at least one of detects and localizes the fault or the malfunction in the at least one function of the first system (ECPB) by at least one of actuators and sensors assigned to the second system (EBS), and (ii) activate an emergency operating program of the second system (EBS) as a replacement for the disrupted functioning of the first system,
wherein the first system is an electric parking brake device (ECPB), and wherein the second system is an electric service brake device (EBS) of a towing vehicle of a towing vehicle/trailer combination, and
wherein the sensors which detect a fault or a malfunction in the electric parking brake device (ECPB) within the scope of self-monitoring, contain at least one pressure sensor of a parking brake module (PBM) and solenoid valves of the parking brake module (PBM) for regulating pressure.

7. The monitoring device of claim 5, wherein the sensors which detect a fault or a malfunction in the electric parking brake device (ECPB) within the scope of self-monitoring, contain at least one pressure sensor of a parking brake module (PBM) and solenoid valves of the parking brake module (PBM) for regulating pressure.

8. The monitoring device of claim 2, wherein at least one of the self-monitoring routines and the external monitoring routines detect a fault or a malfunction of the at least one function of the first system (ECPB) by at least one of the type of the signals modulated by the first system (ECPB) and by the failure of signals modulated by the first system (ECPB) to occur.

9. The monitoring device of claim 2, wherein the first system is an electric parking brake device (ECPB), and wherein the second system is an electric service brake device (EBS) of a towing vehicle of a towing vehicle/trailer combination.

* * * * *

UNITED STATES PATENT AND TRADEMARK OFFICE
CERTIFICATE OF CORRECTION

PATENT NO.        : 8,560,162 B2
APPLICATION NO. : 12/737212
DATED             : October 15, 2013
INVENTOR(S)       : Herges et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 157 days.

Signed and Sealed this

Fifteenth Day of September, 2015

Michelle K. Lee
*Director of the United States Patent and Trademark Office*